United States Patent
Bogdanowicz

(10) Patent No.: US 8,651,140 B2
(45) Date of Patent: Feb. 18, 2014

(54) VALVE ARRANGEMENT FOR DIFFERENT FLOW RATE CATEGORIES

(75) Inventor: Grzegorz Bogdanowicz, Ostfildern (DE)

(73) Assignee: Festo AG & Co. KG, Esslingen (DE)

( * ) Notice: Subject to any disclaimer, the term of this patent is extended or adjusted under 35 U.S.C. 154(b) by 1144 days.

(21) Appl. No.: 12/227,263

(22) PCT Filed: May 12, 2007

(86) PCT No.: PCT/EP2007/004230
§ 371 (c)(1),
(2), (4) Date: Nov. 10, 2008

(87) PCT Pub. No.: WO2008/138371
PCT Pub. Date: Nov. 20, 2008

(65) Prior Publication Data
US 2009/0126812 A1    May 21, 2009

(51) Int. Cl.
*F15B 13/043*    (2006.01)
*F15B 13/00*    (2006.01)
*F16K 1/00*    (2006.01)

(52) U.S. Cl.
USPC ............... 137/625.64; 137/269; 137/884

(58) Field of Classification Search
USPC ................ 137/625.64, 884, 269, 271
See application file for complete search history.

(56) References Cited

U.S. PATENT DOCUMENTS

| | | | | |
|---|---|---|---|---|
| 4,257,572 A | * | 3/1981 | Neff | 251/30.02 |
| 5,983,921 A | * | 11/1999 | Miyazoe et al. | 137/269 |
| 6,109,291 A | * | 8/2000 | Yoshimura | 137/269 |
| 6,109,298 A | * | 8/2000 | Kaneko et al. | 137/551 |
| 2005/0236595 A1 | * | 10/2005 | Miyazoe et al. | 251/129.09 |
| 2006/0081802 A1 | * | 4/2006 | Miyazoe | 251/129.15 |

FOREIGN PATENT DOCUMENTS

| | | |
|---|---|---|
| DE | 4312730 | 10/1994 |
| EP | 0584494 | 3/1994 |
| EP | 1026430 | 8/2000 |
| EP | 1526288 | 4/2005 |
| JP | 2002039419 | 2/2002 |

OTHER PUBLICATIONS

"Ventile Verschiedener Hersteller Auf Einer Grundplatte," O&P Olhydraulik Und Pneumatik, Vereinigte Fachverlage Mainz, DE, BD. 49, Nr. 3, Marz 2005 (Mar. 2005) p. 186, XP001225426.

* cited by examiner

*Primary Examiner* — Len Tran
*Assistant Examiner* — Chee-Chong Lee
(74) *Attorney, Agent, or Firm* — Hoffmann & Baron, LLP

(57) ABSTRACT

A valve arrangement has several valve clusters which are designed for different nominal flow rates. Each valve cluster (1c) comprises a valve base (2) fitted with valve units (4), the valve units (4) respectively having a control portion (13), which is connected by way of electrical interface means (23) with internal signal transmission means (22) of the valve base (2). Irrespectively of the flow rate category the overall height of the valve bases (2), the width of the component mounting sites and of the valve units (4) and also the electrical interface means (23) are identically configured in the case of the valve clusters of all flow rate categories. The modification of the nominal flow rates is performed more especially by the choice of different overall lengths of the valve units (4).

18 Claims, 5 Drawing Sheets

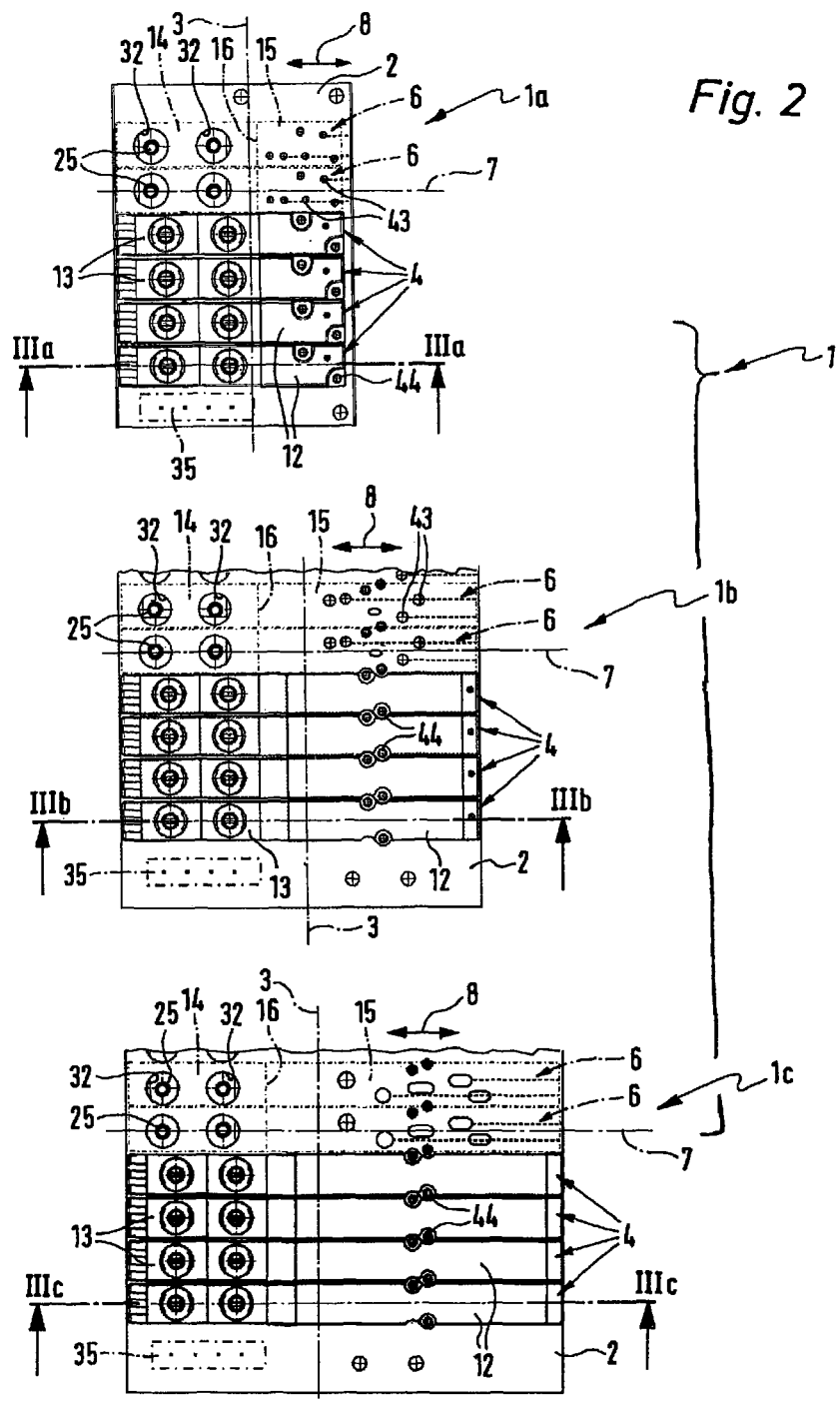

VALVE ARRANGEMENT FOR DIFFERENT FLOW RATE CATEGORIES

This application claims priority based on an International Application filed under the Patent Cooperation Treaty, PCT/EP2007/004230, filed May 12, 2007.

BACKGROUND OF THE INVENTION

The invention relates to valve arrangement comprising several valve clusters belonging to mutually different flow rate categories, said flow rate categories being designed for handling different nominal flow rates, said valve clusters respectively having a valve base with internal fluid valve base ducts and internal electrical signal transmission means, wherein on said valve bases several component mounting sites are present which are arranged adjacent to each other in the direction of a principal axis, such component mounting sites having an elongated outline with a longitudinal axis extending in a transverse direction, at a right angle to the principal axis, of the valve base, and on said component mounting sites a respective valve unit is mounted or is able to be mounted, said valve units having a fluid distribution portion and an electrically operated control portion controlling the fluid flow through the fluid distribution portion, the control portion occupying a control section of the component mounting site where it is connected by way of electrical interface means with the signal transmission means and the fluid distribution portion occupies a fluid distribution portion of the component mounting site and at this position is connected by way of fluid interface means with the valve base ducts, the valve bases belonging to valve clusters of different flow rate categories having different transverse dimensions and for their fluid distribution sections having mounting sites of different length wherein on said valve bases being mounted valve units whose fluid distribution portions are of different length to obtain different sizes of nominal flow rates.

A valve arrangement of this type described in the German patent publication De 43 12 730 A1 is designed in the form of a valve station, in which two valve clusters are collected together which belong to different flow rate categories since they are designed for different nominal flow rates. Each valve cluster comprises a modularly designed valve base which mounts several electrically operated valve units. The valve units are mounted on component sites placed alongside each other in the direction of a principal axis of the respective valve base, said sites extending athwart the principal axis, said sites furthermore being divided up in a fluid distribution section and a control section. At the control section, by way of electrical interface means, there is an electrical connection between individual control portions and signal transmission means extending in the interior of the associated valve base. At the fluid distribution section a fluid distribution valve of the valve unit is connected by way of fluid interface means with internal valve base ducts. The different nominal flow rates are due to different lengths and different widths of the valve units and to valve bases, which have different transverse and height dimensions and on which control mounting sites with different widths are provided. Due to a different configuration of the control portions different electrical interface means are also required. Accordingly in all the design and manufacturing complexity needed to produce valve clusters with different flow rate categories. is quite substantial In the European patent publication EP 1 026 430 B1 there is a description of a modularly designed valve cluster which at the same time is contrived with valve units intended for different nominal flow rates. The different nominal flow rates are in this case again due to different width dimensions of the valve units.

SUMMARY OF THE INVENTION

An important task of the present invention is to provide economic measures in the context of a valve arrangement with valve units seated on valve bases to produce valve clusters with different flow rate categories.

In order to achieve this aim in the case of a valve arrangement of the type initially mentioned there is a provision such that the overall height of the valve bases, the width of the component mounting sites and of the valve units and also the design of the electrical interface means is in agreement with each other in the case of all valve clusters.

In this manner it is possible for different nominal flow rates to be realized with a constant mounting grid of the valve units. Irrespectively of the associated flow rate category the valve units, and also the component mounting sites associated with them on the valve bases have the same width. Variations in the nominal flow are achieved by different length dimensions and possibly in addition different height dimensions of the valve units as well. Within the valve bases it is possible for the valve base ducts to be accommodated without any trouble for adaptation to the desired nominal flow rate despite there being the same overall height of the valve bases, since owing to the larger transverse dimensions for higher nominal flow rates there is sufficient volume of the structure in order to integrate valve base ducts with different flow cross sections.

The same overall height of all valve bases entails a simplification of manufacturing and assembly operations, something which also applies for the electrical interface means which are identical for all valve clusters.

Within the context of the invention it is also possible to utilize identical control portions and also identical electrical signal transmission means for the valve clusters of all flow rate categories. The manufacturing, assembly and quality control processes can be made uniform. The latter also applies for ordering parts and logistics. A large number of components is suitable for use for every flow rate category so that the variety of components may be reduced.

Further advantageous developments of the invention are defined in the dependent claims.

The control portions of the valve units are more particularly control valve means. Here more particularly solenoid valve means or piezoelectric valve means are to be recommended.

For lower nominal flow rates the control valve means may be the only valve means of the valve unit. The fluid distribution portion may in this case be designed as a fluid lead through passage means which is valve-less and is simple to manufacture. In the case of larger nominal flow rates the control valve means preferably functions as a pilot valve means of a fluid distribution portion, which is designed as the distribution valve means. The valve unit is in this case therefore of the pilot controlled type, in which case by adaptation more particularly of the overall length of the distribution valve means and possibly additionally of its overall height the necessary volume is created for the required flow cross sections.

BRIEF DESCRIPTION OF THE DRAWINGS

Preferably the control portions of the valve units are identical irrespectively of the assigned flow rate category. Accordingly independently of the selected flow rate category only a single uniform type of control portions is necessary in all cases.

For the accommodation of the internal signal transmission means the valve bases preferably have a single receiving duct extending through them longitudinally. The cooperation of the electrical interface means is in this case ensured by apertures, which connect the receiving duct with the control sections of the component mounting sites and which allow the insertion of the electrical interface structures. The design and arrangement of the receiving duct and of the apertures are identical in the case of the valve bases irrespectively of the assigned flow rate category.

In the receiving duct a concatenation board for signal transmission may be inserted. The term "signal" is here to be interpreted in a wide sense and can mean both a control signals and also actuating power.

The valve bases are preferably integral board bodies, whose length in the direction of the principal axis may be selected as needed in a manner dependent on the number of the mandatory component mounting sites. As an alternative it is nevertheless possible to have a structure which is modular in the longitudinal direction of the valve bases so that the valve base is composed of a variable number of valve base modules able to be placed together, such modules having one or more component mounting sites.

Preferably in all valve clusters the same attachment principles will apply for the valve units. It is simplest to provide attachment by screws for the valve units on the associated valve base.

In the following the invention will be described with reference to the accompanying drawings.

Figure 1:
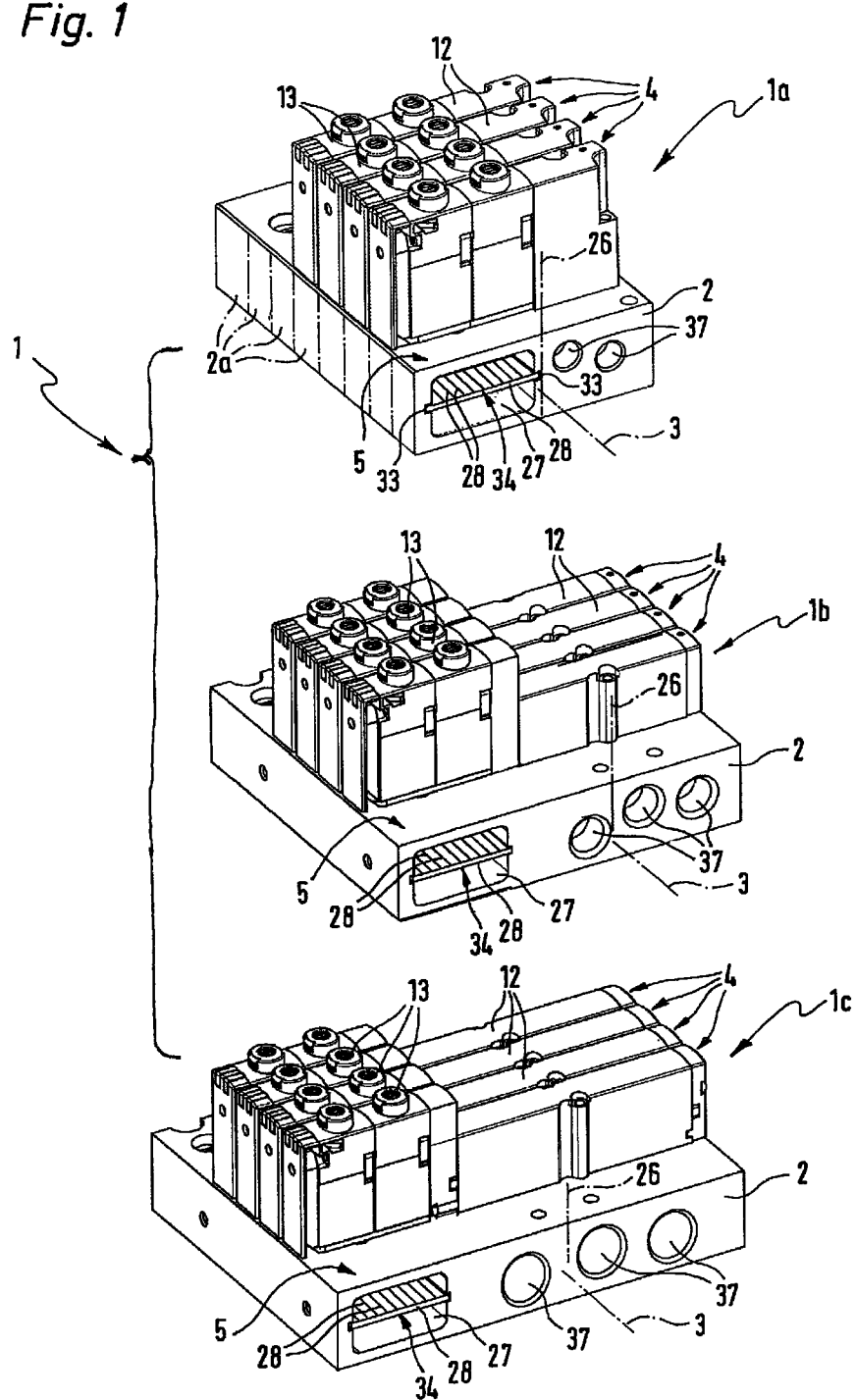

FIG. 1 shows three valve clusters with different flow rate categories in a preferred design of the valve arrangement, each being illustrated in perspective.

FIG. 2 show a plan view of the valve clusters of FIG. 1.

Figure 3A:
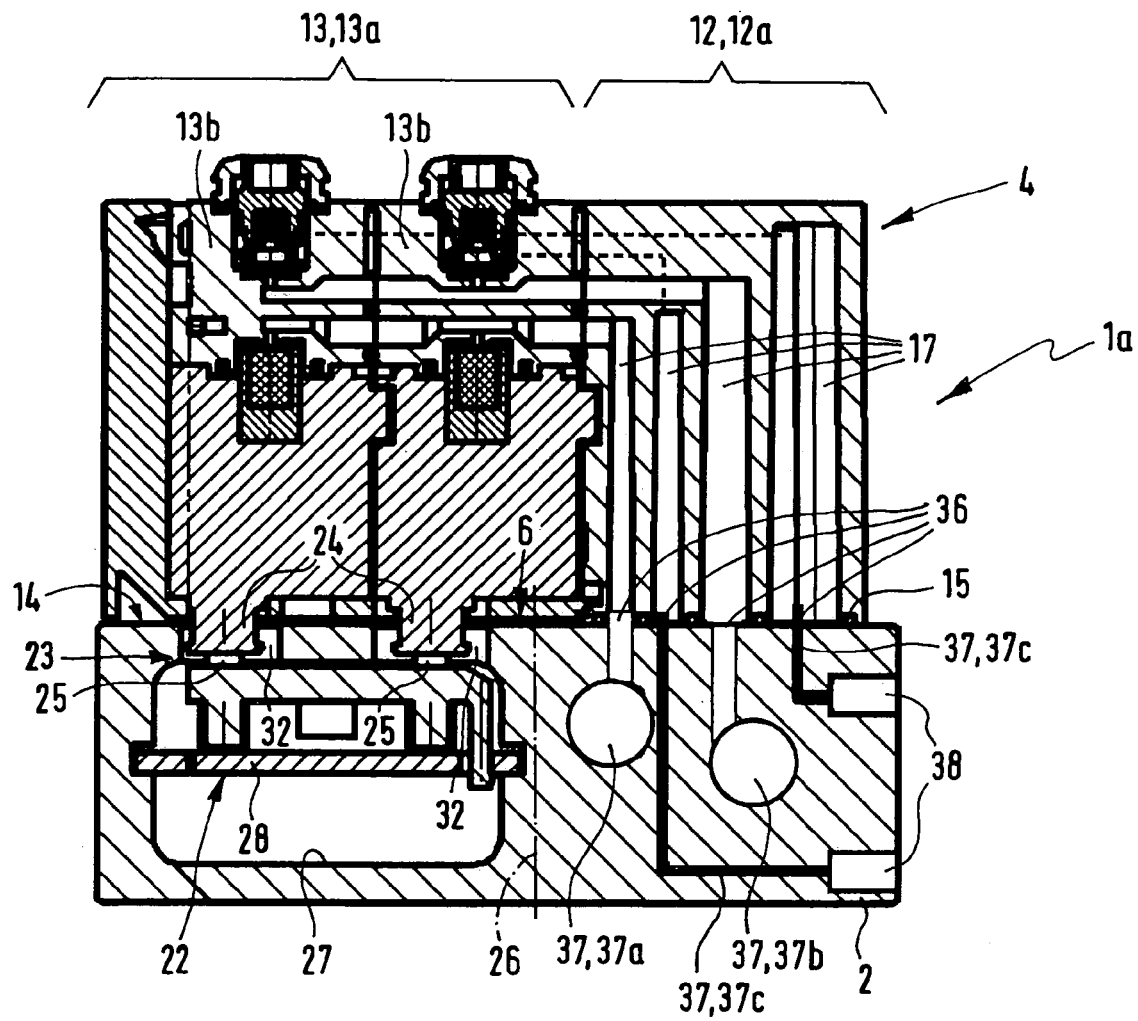

FIG. 3a shows a cross section taken through the valve cluster of FIGS. 1 and 2 taken on the section line IIIa-IIIa of FIG. 2.

Figure 3B:
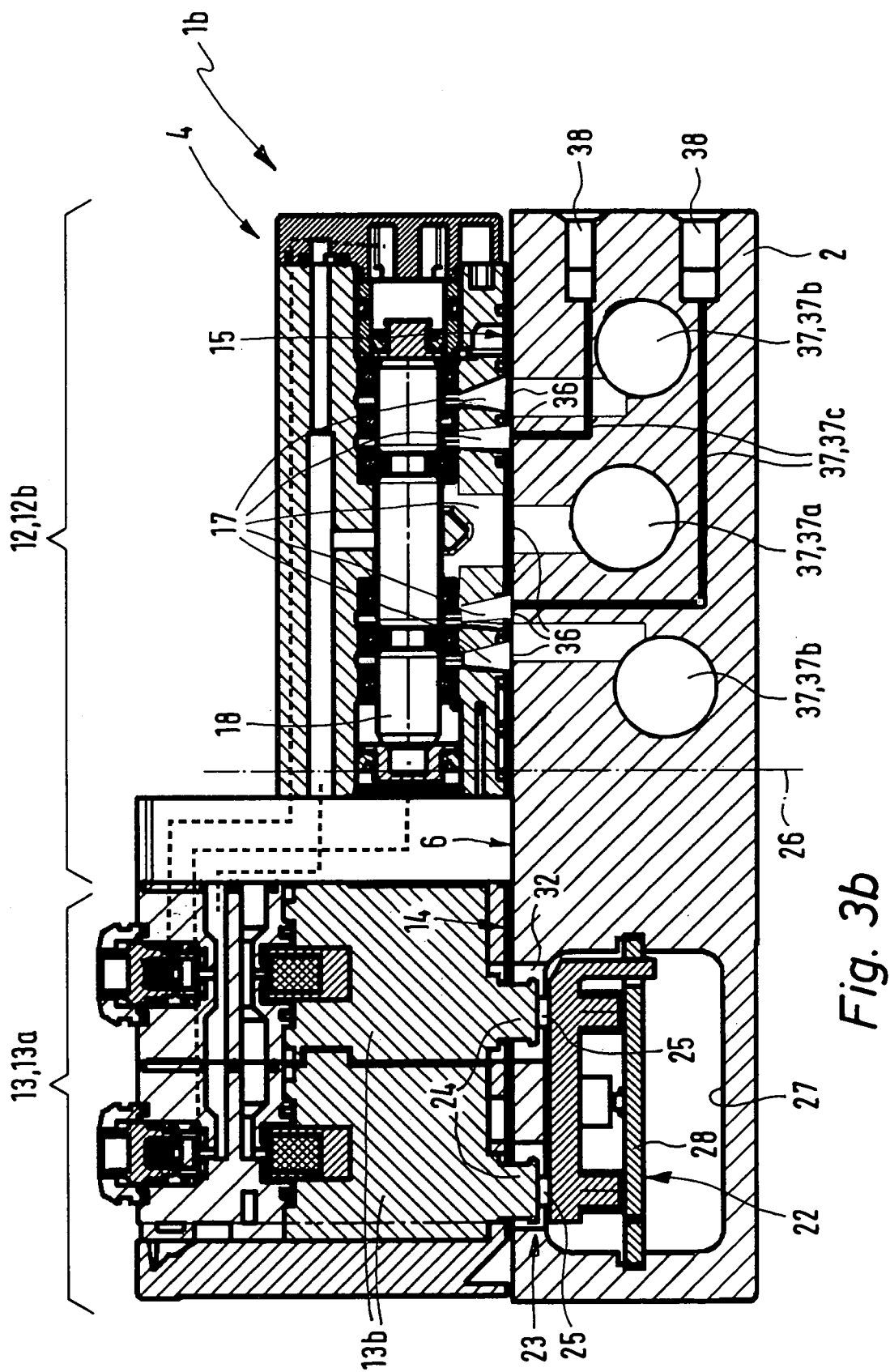

FIG. 3b is a cross section taken through the valve cluster of FIGS. 1 and 2 taken on the section line IIIb-IIIb of FIG. 2.

Figure 3C:
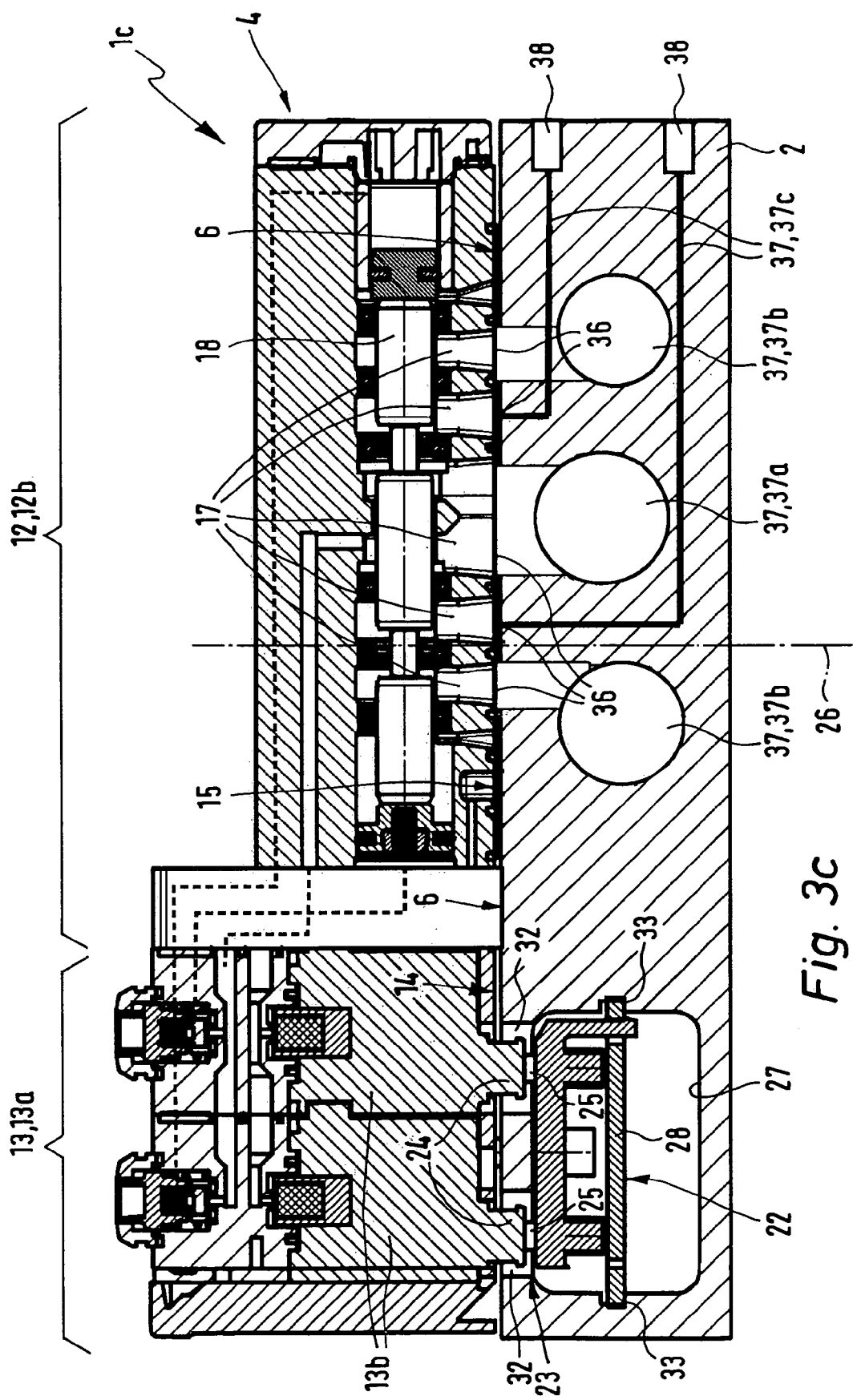

FIG. 3c is a cross section taken through the valve cluster of FIGS. 1 and 2 taken on the section line IIIc-IIIc of FIG. 2.

DETAILED DESCRIPTION OF THE PREFERRED EMBODIMENTS

The valve arrangement 1 of the working example comprises three mutually independent and self-contained valve clusters, if which the first one (1a) is illustrated in FIGS. 1, 2 and 3a, the second one (1b) in FIGS. 1, 2, and 3b and the third one in FIGS. 1, 2, 2c and 3c. These three valve clusters are designed for different nominal flow rates and accordingly belong to different flow rate categories. The first valve cluster 1a handles the smallest flow and the third valve cluster 1c handles the largest flow. A second valve cluster 1b is for a flow rate lying between the maximum and minimum flow rates. Each valve cluster 1a, 1b and 1c possesses a valve base 2 with a principal axis 3 defining its longitudinal direction. In the present example the valve base 2 is in each case made in the form of an integral plate. It could nevertheless be composed of several valve base modules 2a assembled in the direction of the principal axis 3 on each other, as is indicated in chained lines in FIG. 1.

Preferably the valve base 2 has a rectangular cross section when considered athwart the principal axis 3, as is more particularly indicated in FIGS. 3a, 3b and 3c.

One of the two outer faces with a large surface area of the valve base 2 constitute a component mounting face 5 provided for mounting the individual valve units 4. Preferably it has a rectangular outline.

The component mounting face 5 is divided up into several component mounting sites 6, which are placed adjacent to each other in the direction of the principal axis 3. On each of such component mounting sites 6 one of the valve units 4 can be mounted. To make the drawing more straightforward the valve clusters 1a, 1b and 1c are only illustrated in drawing partly fitted with components so that some component mounting sites are unoccupied. Their outlines are for clarity indicated in chained lines in FIG. 2.

It is evident that the component mounting sites 6 have an elongated outline with a longitudinal axis 7, running at a right angle to the principal axis 3 in the transverse direction 8, indicated by a double arrow, of the respective valve base 2.

The arrangement is more especially so designed that the component mounting site 6 extends along the full width, as measured in the transverse direction 8, of the valve base 2. The component mounting sites 6 are in each case alongside one another.

The transverse dimensions, also able to be termed width dimensions, of the valve base 2 in the transverse direction 8 are different in the case of the individual valve clusters 1a, 1b and 1c. More particularly they increase in size with an increase in the flow rate category, i. e. the larger the nominal flow rate is, which is to be handled by the respective valve cluster 1a, 1b and 1c. The same applies for the longitudinal dimensions of the respectively associated component mounting sites 6. In the case of the first valve cluster 1a the dimensions are smallest, in the case of the three valve cluster 1c largest and in the case of the second valve cluster 1b the dimensions are in between.

Irrespectively of their belonging to the one or the other flow rate category the component mounting sites 6 of all valve bases 2 have identical width dimensions in the direction of the principal axis 3. It is accordingly a question of component mounting sites 6 which are equal in width independently of the flow rate category but are different in length.

The above mentioned length and width definition also applies for the valve units 4 of the individual valve clusters 1a, 1b and 1c. The width of all valve clusters 4 is therefore equal and independent of the nominal flow rate, whereas the length increases with the nominal flow rate. Preferably the length and the width are in agreement with corresponding dimensions of the respectively associated component mounting site 6.

The length of the valve bases 2 can be different in the case of the various valve clusters 1a. 1b and 1c. It is dependent on the number of the mounted valve units 4 for the particular purposes. Therefore it is not necessary for all valve clusters 1a, 1b and 1c of a valve arrangement to have the same length. The actual overall length is set during the manufacture of the respective valve cluster 1, 1b and 1c, more particularly by cutting off from extrude material of indefinite length.

The structure of the valve units 4 is of the same design independently of the respective flow rate category. Each valve unit 4 has a fluid distribution portion 12 and an electrically operated control portion 13 joined to it as a self-supporting subassembly. The fluid distribution portion 12 and the control portion 13 are arranged in the longitudinal direction of the valve unit 4 in sequence, the control portion 13 defining the back end portion of the respective valve unit 4. The control portion 13 is in a position to control the fluid flow through the associated fluid distribution portion 12 in a manner dependent on the operational state.

In a condition mounted on a component mounting site 6 the valve unit 4 has its section, termed the control section 14, on the component mounting site 6 and the fluid distribution portion 12 is on, a section (termed the fluid distribution portion 15 and adjoining the distribution portion 12 in the direction of the longitudinal axis 7) of the component mounting site 6. In FIGS. 2*a*, 2*b* and 2*c* the transitional zone between these two control sections 14 and 15 is marked by a respective imaginary line 16 of separation in chained lines.

In the case of all valve units 4 of the working example the control portion 13 is designed as the electrically operated control valve means 13. In the example it is composed of respectively two control valve units 13*b* placed in sequence in the direction of the length axis 7, such number however not being mandatory. Thus the control valve means 13*a* could for example be in the form of a single control valve unit 13*b*.

Preferably each control valve means 13*a* is in the form of a spool valve means, but however it could for example also be a piezoelectric valve means or an electrostatically activated micro valve means.

The fluid distribution portion 12 has several fluid distribution ducts 17 running through it. The control portion 13 is in a position of controlling fluid flow rate through these fluid distribution ducts 17 by connecting the fluid distribution ducts 17 in a particular pattern or separating them from each other. If a valve unit 4, as in the case of the first valve cluster 1*a*, is designed for a relatively small nominal flow rate, the control valve means 13*a* can be the only valve means of the valve unit 4. The fluid distribution portion 12 is in this case a valveless fluid through passage means 12*a*, the fluid flow through the fluid distribution ducts 17 of the fluid through passage means 12*a* being exclusively and directly governed by the control valve means 13*a*. The nominal flow rate in the valve unit 4 is in this case normally defined by the nominal flow rate of the control valve means 13*a*.

In the case of valve units 4 designed for higher nominal flow rates, as is the case with the second and third valve cluster 1*b* and 1*c* of the valve arrangement, the fluid distribution portion 12 is preferably in the form of a distribution valve means 12*b*, which can control a higher fluid flow rate than the control valve means 13*a*. The latter merely functions in this case as a pilot valve means for the distribution valve means 12*b* and accordingly governs the fluid flow in the fluid distribution portion 12 only indirectly. The valve units 4 are in this case therefore designed as pilot multiway valves.

Each distribution valve means 12*b* comprises at least one valve member 18 placed on at least some fluid distribution ducts 17 and influencing the fluid flow through the fluid distribution ducts 17 in a fashion dependent on its current switching position. The switching position of the valve member 18 is set in a known manner by fluid force, that is to say governed by the control valve means 13*a*.

Since in this case the controllable fluid flow rate in the fluid distribution ducts 17 is not restricted by the switching force of the control valve means 13*a*, higher nominal flow rates may be controlled than in the case of non pilot-controlled valve units 4 as in the case of the first valve cluster 1*a*.

Each control portion 13 receives its electrical actuating signals via electrical signal transmission means 22 laid in the interior of the valve base 2. In the installed state of the valve units 4 such means 22 are connected electrically by way of associated electrical interface means 23 with the associated control portion 13. It is an advantage in this respect that such electrical interface means 23 are all of the same design irrespectively of the respective flow rate category in the case of all valve clusters of the valve arrangement. Accordingly there is an identical electrical interface for the valve units 4 of all valve clusters 1*a*, 1*b* and 1*c*, something which reduces the complexity of manufacture to a minimum.

It is even expedient for the electrically actuated control portions for all flow rate categories to be the same in design.

Accordingly it is possible to resort to one and the same type of control portion 13 irrespectively of whether such valve performs a direct fluid control or an indirect one by actuation of a distribution valve means 12*b*.

On the bottom side, facing the valve base 2, the electrical interface means 23 comprise contact means 24 on the valve side. They atomically come into electrical contact with contact means 25 on the valve base side and belonging to the electrical interface means 23, the contact means 25 being arranged at each control sections 14 and being respectively connected in a electrically conducting manner with the electrical signal transmission means 22. The contact means 24 and 25 are preferably plug contact means.

In a portion, which as considered in a direction of the vertical axis 26 perpendicular to the component mounting face 5, lies underneath the control section 14 each valve base 2 has a receiving duct 27 extending through it in parallelism to the principal axis 3. In such duct the electrical signal transmission means 22 are preferably accommodated. In the working embodiment the same respectively include an electrical concatenation board 28 extending through all control sections 14 and bearing the valve base's contact means 25 at the individual control section 14. To ensure that such contact means 25 are accessible for the contact means 24 on the valve base the wall of the valve base 2 has at least one aperture 32 extending through it opposite to the contact means 25 in the direction of the vertical axis 6, such aperture 32 belonging as well to the electrical interface means 23 and connecting the control section 14 with the receiving duct 27. These apertures 32 render possible access by the contact means 24 on the valve side and/or the contact means 25 on the valve base side for this purpose of uniting them.

In the working example the electrical interface means 23 have two aperture 32 arranged alongside each other in the direction of the longitudinal axis 6 and through such aperture 32 electrical contact is produced.

The receiving duct 27 is preferably made with the same identical cross section in the case of all valve bases 2. It can have one or more lateral attachment slots 33 extending in the longitudinal direction, into which the concatenation board 28 is inserted for securing it to the valve base 2.

The concatenation board 28 bears several electrical conductors 28 extending in the longitudinal direction, more particularly in the form of printed wiring, which starting at an end connection portion 34 of the concatenation board 28 extend to the different contact means 25 on the valve base. At the connection portion 34 a central electrical connection device 35 may be disposed, which in the drawing is only indicated diagrammatically and renders possible communication with an external electronic control means. For instance a multiple connection device may be employed, through a field bus connection device is possible, dependent on which type of signal transmission is chosen.

The fluid distribution ducts 17 of the valve units 4 mounted at the component mounting sites 6 are connected for fluid flow by way of a suitable fluid interface means 36 with valve base ducts 37 formed in the associated valve base 2. Of these valve base ducts 37 at least one duct is in the form of a supply duct 37*a* and at least one further duct in the form of a discharge duct 37*b*. These two types of duct 37*a* and 37*b* extend through the valve base 2 in the direction of its principal axis 3 and open respectively at the fluid distribution sections 15 of all component mounting sites 6 of the associated valve base 2.

Moreover, for each fluid distribution section 15 there is at least one further valve base duct 37 individually provided for it, in the case of which it is a question of a power duct 37c, which more especially extends athwart the principal axis 3 in the valve base 2 and opens at a connection port 38 on a lateral outer face of the valve base 2. In the working embodiment two such power ducts 37c extend from each fluid distribution section 15.

During operation of a valve cluster 1a, 1b, and 1c the supply duct 37a is joined with a pressure source supplying fluid pressure medium, whereas the at least one discharge duct 37b is connected with a pressure sink and more particularly with the atmosphere. The valve clusters 1a, 1b and 1c are more particularly operated with compressed air, though other gaseous or liquid pressure mediums could in principle be employed.

The connection ports 38 of the power ducts 37c are able to be joined with loads, as for example drives operated by fluid power.

Dependent on the particular state of operation of a valve unit 4 the at least one power duct 37c connected with it is connected either with the supply duct 37a or a discharge duct 37b.

The fluid interface means 36 comprise more particularly the duct ports 43, arranged on the fluid distribution sections 15, of the valve base ducts 37 and the duct ports, communicating therewith, on the bottom side of a respective fluid distribution portion 12, which belong to the fluid distribution ducts 17 running inside it.

As may furthermore be directly seen from the drawing the different length of the component mounting sites 6 is more particularly due to the different longitudinal dimensions of the fluid distribution sections 15, as an adaptation to the different lengths of the fluid distribution portions 12 of the individual valve units 4. The fluid distribution sections 15 and the fluid distribution portions 12 have a length which is greater dependent on the nominal flow rate handled by them. This is due to the fact that with an increase in the nominal flow rate the duct cross sections of the fluid distribution ducts 17 become larger and occupy correspondingly more volume within the housing of a respective fluid distribution portion 12.

It is however important for the width, considered in the direction of the principal axis 3, of the component mounting sites 6 and of the valve units 4 for the valve clusters 1a, 1b and 1c of all flow rate categories to be the same. The assembly grid of the valve units 4 on the valve base 2 of the individual valve clusters 1a, 1b and 1c is therefore constant.

There is nevertheless the possibility of varying the overall height, as measured in the direction of the vertical axis 26 perpendicular to the component mounting face 5 of the fluid distribution ducts 12 for optimum arrangement of the fluid distribution ducts 17.

On the contrary the valve clusters 1a, 1b and 1c of all identical flow rate categories have identical overall heights (as regards the individual valve bases 2) as measured in the direction of the vertical axis 26. Accordingly plate material of equal thickness may be employed as a raw material in manufacture.

As regards the different valve bases 2 there is therefore an identity of their overall height and as regards the width of the component mounting sites 6 and also as regards the associated electrical interface means 23. These parameters are the same for all valve bases 2 independently of the associated flow rate categories. As a variable parameter therefore only the transverse dimensions of the valve bases 2 dependent on the nominal flow rate and furthermore the distribution and configuration of the valve base ducts 37 remaining in the portion, associated with the fluid distribution section 15, of the valve base 2. In other words it is possible to say that the rear end portion associated the control section 14 is always constant and variations only take place in the front portion, associate with the fluid distribution section 15, of the valve base 2.

The same also goes for the valve units 4, which may be designed identically in their rear end portion, defined by the control portion 13, and only differ in the configuration of the fluid distribution portion 12, the overall width however always being constant.

The cross sections of the fluid distribution ducts 37 can be identical in the case of all valve bases 2, if design is on the basis of the maximum nominal flow rate. The variation in the nominal flow rate is then exclusively due to the use of fluid distribution portions 12, whose ducts 17 have mutually different cross sections. It is however considered to be most expedient, for optimizing the arrangement of the ducts within the valve base 2 as well, to resort to valve base ducts 37 whose cross sections are adapted to the nominal flow rate to be handled by the individual valve clusters 1a, 1b and 1c. In the working embodiment this is the case so that here the cross sections of the fluid distribution ducts 17 and of the valve base ducts 37 too also become larger with an increase in the nominal flow rate.

For the attachment of the valve units 4 on the valve bases 2 it is best to always resort to one and the same principle of fastening. In the working embodiment screw attachment is provided. The attachment screws 44 running through the valve units 4 in the direction of the vertical axis 26 are screwed into threaded holes in the valve base 2.

While the valve arrangement of the working embodiment has three valve clusters with different flow rate categories, the number of the different flow rate categories within one and the same valve arrangement can obviously be greater or less. The advantages of the valve arrangement are more particularly due to the better manufacture and fitting work, where there is a possibility of having a valve cluster series with great adaptability. whose fluid efficiency may be altered while still maintaining many common features by modifying only a few parameters.

It would in principle be possible to unite several valve clusters as a single subassembly, if corresponding adapter portions are employed. A significant advantage of the valve arrangement is however that the individual valve clusters may be offered as self-contained subassemblies, which as such may also be operated alone and independently.

The invention claimed is:

1. A valve arrangement comprising several valve clusters belonging to mutually different flow rate categories, said flow rate categories being designed for handling different nominal flow rates, said valve clusters respectively having a valve base with internal valve base ducts and internal electrical signal transmission means, on said valve bases several component mounting sites are present arranged adjacent to each other in the direction of a principal axis, such component mounting sites having an elongated outline with a longitudinal axis extending in a transverse direction, at a right angle to the principal axis, of the valve base, and on said component mounting sites a respective valve unit is mounted or is able to be mounted, said valve units having a fluid distribution portion and an electrically operated control portion controlling the fluid flow through the fluid distribution portion, the control portion occupying a control section of the component mounting site where it is connected by way of electrical interface means with the internal electrical signal transmission means and the fluid distribution portion occupies a fluid distribution section of the component mounting site and at this position is connected by way of fluid interface means with the valve base ducts, the valve bases which are belonging to valve clusters of different flow rate categories having different transverse dimensions and in favor of their fluid distribution sections having mounting sites of different length wherein on said valve bases being mounted valve units whose fluid distribution portions are of different length to obtain different nominal flow rates, and wherein the overall height of the valve bases, the width of the component mounting sites and of the valve units and also the design of the electrical interface means is the same in the valve clusters of all flow rate categories, and wherein each of the valve bases have a receiving duct extending through longitudinally, such receiving duct receiving the electrical signal transmission means and being open to the control portions by way of at least one aperture extending through a wall of the valve base, wherein an electrical connection between the control portions and the signal transmission means takes place through the aperture, and wherein the signal transmission means include a concatenating board inserted in the receiving duct and extending through the receiving duct in the longitudinal direction.

2. The valve arrangement as set forth in claim 1, wherein the valve clusters belonging to different flow rate categories are designed as mutually independent and self-contained subassemblies.

3. The valve arrangement as set forth in claim 2, wherein, in the case of at least one valve cluster, at least one control portion is designed as a control valve means.

4. The valve arrangement as set forth in claim 3, wherein the control portions of all valve clusters are designed as control valve means.

5. The valve arrangement as set forth in claim 2, wherein at least one fluid distribution portion of at least one valve cluster is designed as a fluid distribution valve means.

6. The valve arrangement as set forth in claim 1, wherein, in the case of at least one valve cluster, at least one control portion is designed as a control valve means.

7. The valve arrangement as set forth in claim 6, wherein the control portions of all valve clusters are designed as control valve means.

8. The valve arrangement as set forth in claim 7, wherein at least one fluid distribution portion of at least one valve cluster is designed as a fluid distribution valve means.

9. The valve arrangement as set forth in claim 6, wherein at least one fluid distribution portion of at least one valve cluster is designed as a fluid distribution valve means.

10. The valve arrangement as set forth in claim 1, wherein at least one fluid distribution portion of at least one valve cluster is designed as a fluid distribution valve means.

11. The valve arrangement as set forth in claim 10, wherein all fluid distribution portions of at least one valve cluster are designed in the form of fluid distribution valve means.

12. The valve arrangement as set forth in claim 1, wherein at least one fluid distribution portion of at least one valve cluster is designed as a valve-less fluid through passage means.

13. The valve arrangement as set forth in claim 12, wherein all fluid distribution portions of at least one valve cluster are designed as fluid through passage means.

14. The valve arrangement as set forth in claim 1, wherein the control portions of the valve units of several valve clusters belonging to different flow rate categories are identical in configuration.

15. The valve arrangement as set forth in claim 1, wherein the electrical signal transmission means of several valve clusters belonging to different flow rate categories are identically designed.

16. The valve arrangement as set forth in claim 1, wherein at least some of the valve base ducts of the valve clusters belonging to different flow rate categories have different sizes of duct cross section.

17. The valve arrangement as set forth in claim 1, wherein the valve bases are designed in the form of plate bodies made in one piece.

18. The valve arrangement as set forth in claim 1, wherein the valve units of all valve clusters are secured to the valve base using the same attachment principle.

* * * * *

UNITED STATES PATENT AND TRADEMARK OFFICE
CERTIFICATE OF CORRECTION

PATENT NO. : 8,651,140 B2  Page 1 of 1
APPLICATION NO. : 12/227263
DATED : February 18, 2014
INVENTOR(S) : Grzegorz Bogdanowicz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1257 days.

Signed and Sealed this
Twenty-ninth Day of September, 2015

Michelle K. Lee
*Director of the United States Patent and Trademark Office*